(12) United States Patent
Yamada et al.

(10) Patent No.: US 6,400,070 B1
(45) Date of Patent: *Jun. 4, 2002

(54) ELECTRON EMISSION DEVICE AND DISPLAY DEVICE USING THE SAME

(75) Inventors: Takashi Yamada; Kiyohide Ogasawara; Takamasa Yoshikawa; Takashi Chuman; Nobuyasu Negishi; Shingo Iwasaki; Hiroshi Ito; Atsushi Yoshizawa; Shuuichi Yanagisawa; Kazuto Sakemura, all of Tsurugashima (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/131,224

(22) Filed: Aug. 7, 1998

(30) Foreign Application Priority Data

Aug. 8, 1997 (JP) .............................................. 9-215135

(51) Int. Cl.$^7$ ................................ H01J 1/02; H01J 1/62
(52) U.S. Cl. ....................... 313/310; 313/509; 313/506; 257/10
(58) Field of Search ................................. 313/497, 310, 313/351, 495, 509, 309, 506; 257/10; 438/20; 315/169.1, 169.3

(56) References Cited

U.S. PATENT DOCUMENTS

| | | | | |
|---|---|---|---|---|
| 5,729,094 A | * | 3/1998 | Geis et al. ................. | 315/169.1 |
| 5,923,956 A | * | 7/1999 | Kondou et al. ............. | 438/118 |
| 5,936,257 A | * | 8/1999 | Kusunoki et al. ........... | 257/10 |
| 5,962,959 A | * | 10/1999 | Iwasaki et al. ............. | 313/310 |
| 5,986,390 A | * | 11/1999 | Chuman et al. ............. | 313/310 |
| 5,990,605 A | * | 11/1999 | Yoshikawa et al. ......... | 313/310 |
| 6,066,922 A | * | 5/2000 | Iwasaki et al. ............. | 315/169.3 |
| 6,130,503 A | * | 10/2000 | Negishi et al. ............. | 313/495 |
| 6,201,342 B1 | * | 3/2001 | Hobart et al. ............... | 313/309 |
| 6,274,881 B1 | * | 8/2001 | Akiyama et al. ............ | 257/10 |
| 6,278,230 B1 | * | 8/2001 | Yoshizawa et al. ......... | 313/310 |

FOREIGN PATENT DOCUMENTS

JP 7-65710 3/1995

OTHER PUBLICATIONS

N. Koshida et al., "Cold Electron Emission from Electroluminescent Pourous Silicon Diodes", Japanese Journal of Applied Physics, Supplements, vol. 34, No. 6A, Part 02, Jun. 1, 1995, pp. 705–707.

M. Suzuki et al., "Emission and Beam–Divergence Properties of an MIM–Cathode Array for Display Applications", 1997 SID International Symposium Digest of Technical Papers; May 13–15, 1997, vol. 28, pp. 123–126.

Abstract of JP 07–130282 A (Hitachi Ltd), Derwent Publications Ltd.

* cited by examiner

Primary Examiner—Nimeshkumar D. Patel
Assistant Examiner—Kanbi Guharay
(74) Attorney, Agent, or Firm—Morgan, Lewis & Bockius LLP

(57) ABSTRACT

An electron emission device exhibits a high electron emission efficiency. The device includes an electron-supply layer of metal or semiconductor, an insulator layer formed on the electron-supply layer, and a thin-film metal electrode formed on the insulator layer. The insulator layer has a film thickness of 50 nm or greater. The electron-supply layer is made of a silicon wafer. When an electric field is applied between the electron-supply layer and the thin-film metal electrode, the electron emission device emits electrons.

12 Claims, 6 Drawing Sheets

ELECTRON EMISSION DEVICE AND DISPLAY DEVICE USING THE SAME

BACKGROUND OF THE INVENTION

1. Field of the Invention

The present invention relates to an electron emission device and an electron emission display device using the same.

2. Description of the Related Art

In field electron emission display apparatuses, a Field Emission Display (FED) is known as a planar emission display device equipped with an array of cold-cathode electron emission source which does not require cathode heating. The emission principle of, for example, an FED using Spindt-type cold cathodes of minute protrusions is as follows: Its emission principle is like a Cathode Ray Tube (CRT), although this FED has a cathode array of Spindt-type protrusions which is different from that of CRT. In the FED, electrons are drawn into a vacuum space by means of each gate electrode spaced apart from the Spindt-type cathode, and the electrons are made to impinge upon the fluorescent substance that is coated on a transparent anode, thereby causing light emission.

This FED, however, has a problem of low production yield because the manufacture of the minute Spindt-type emitter arrays as a cold cathode is complex and involves many processes.

There also exists an electron emission device with a metal-insulator-metal (MIM) structure as a planar electron emission source. The electron emission device with the MIM structure comprises an Al underlayer as a base electrode, an $Al_2O_3$ insulator layer with about 10 nm thickness, and an Au overlayer, as a top electrode with about 10 nm thickness which are formed in order on the substrate. In the case that this MIM device is placed under an opposing electrode in a vacuum, when a voltage is applied between the Al underlayer and the Au overlayer and, at the same time, an acceleration voltage is applied to the opposing electrode, then some of electrons emit out of the Au overlayer and reach the opposing electrode. Even the electron emission device with the MIM structure does not yet provide a sufficient amount of emitted electrons.

To improve these disadvantages of emission of the MIM device, it is conventionally considered that there is a necessity to make the $Al_2O_3$ insulator layer thinner by about several nanometers and make the $Al_2O_3$ insulator layer with a uniform quality so that the interface between the $Al_2O_3$ insulator layer and the Au overlayer is more uniform.

To provide a thinner and more uniform insulator layer, for example, an attempt has been made to control the anodized current by using an anodization method thereby to improve the electron emission characteristics, as in the invention described in Japanese Patent Application kokai No. Hei 7-65710.

However, even an electron emission device with the MIM structure which is manufactured by this anodization method ensures an emission current of about $1\times10^{-5}$ $A/cm^2$ and an electron emission efficiency of about $1\times10^{-3}$.

OBJECTS AND SUMMARY OF THE INVENTION

Accordingly, it is an object of the present invention to provide an electron emission device with a high electron emission efficiency capable of stably emitting electrons with a low applied voltage thereto and an electron emission display apparatus using the same.

In consideration to a universal application of this electron emission device, the usage of silicon (Si) for an electron-supply layer in the electron emission device is effective to improve the stability of the device and also the use of an amorphous silicon (a-Si) layer deposited by a sputtering method is effective in a high productivity and therefore is very useful. However there is a problem that the property of the a-Si layer is apt to deteriorate due to a heat treatment thereto, because of existence of many dangling bonds e.g., about $10^{20}/cm^3$ in the layer. Since the heat treatment is necessary for vacuum-packaging of the device, the existence of many dangling bonds in the amorphous silicon layer is one of obstacles to a practical use of the electron emission device display. Accordingly, it is another object of the present invention to provide an electron emission device with a high stability at a high temperature and an electron emission display apparatus using the same.

In order to overcome the foregoing and other problems, the object of the invention are realized by an electron emission device in accordance with embodiments of this invention, wherein the device according to the invention comprises:

an electron-supply layer made of metal or semiconductor;
an insulator layer formed on the electron-supply layer; and
a thin-film metal electrode formed on the insulator layer and facing a vacuum space,
characterized in that said insulator layer has a film thickness of 50 nm or greater, and said electron-supply layer is made of a silicon wafer, whereby the electron emission device emits electrons when an electric field is applied between the electron-supply layer and the thin-film metal.

Moreover a display device using an electron emission device according to the invention comprises:

a pair of first and second substrates facing each other with a vacuum space in between;
a plurality of electron emission devices provided on the first substrate;
a collector electrode provided in the second substrate; and
a fluorescent layer formed on the collector electrode,
each of the electron emission devices comprising an electron-supply layer of metal or semiconductor; an insulator layer formed on the electron-supply layer; and a thin-film metal electrode formed on the insulator layer and facing a vacuum space, wherein said insulator layer has a film thickness of 50 nm or greater, and said electron-supply layer is made of a silicon wafer.

According to the electron emission device of the invention with the above structure, dangling bonds decrease in the electron-supply layer so that the thermal stability of the device is improved, and through-bores are not likely to be produced in the insulator layer because of its relatively thick thickness and then the production yield is improved.

The electron emission device of the invention is a planar or spot-like electron emission diode and can be adapted to high speed devices such as a source of a pixel vacuum tube or bulb, an electron emission source of a scanning or transmission electron microscope, a vacuum-micro electronics device and the like. In addition, this electron emission device can serve as a minute microwave tube or a diode which emits electromagnetic waves with millimeter or sub-millimeter wavelength, and also can serve as a high speed switching device.

DETAILED DESCRIPTION OF THE PREFERRED EMBODIMENTS

Preferred embodiments according to the present invention will be described in more detail with reference to the accompanying drawings.

Figure 1:
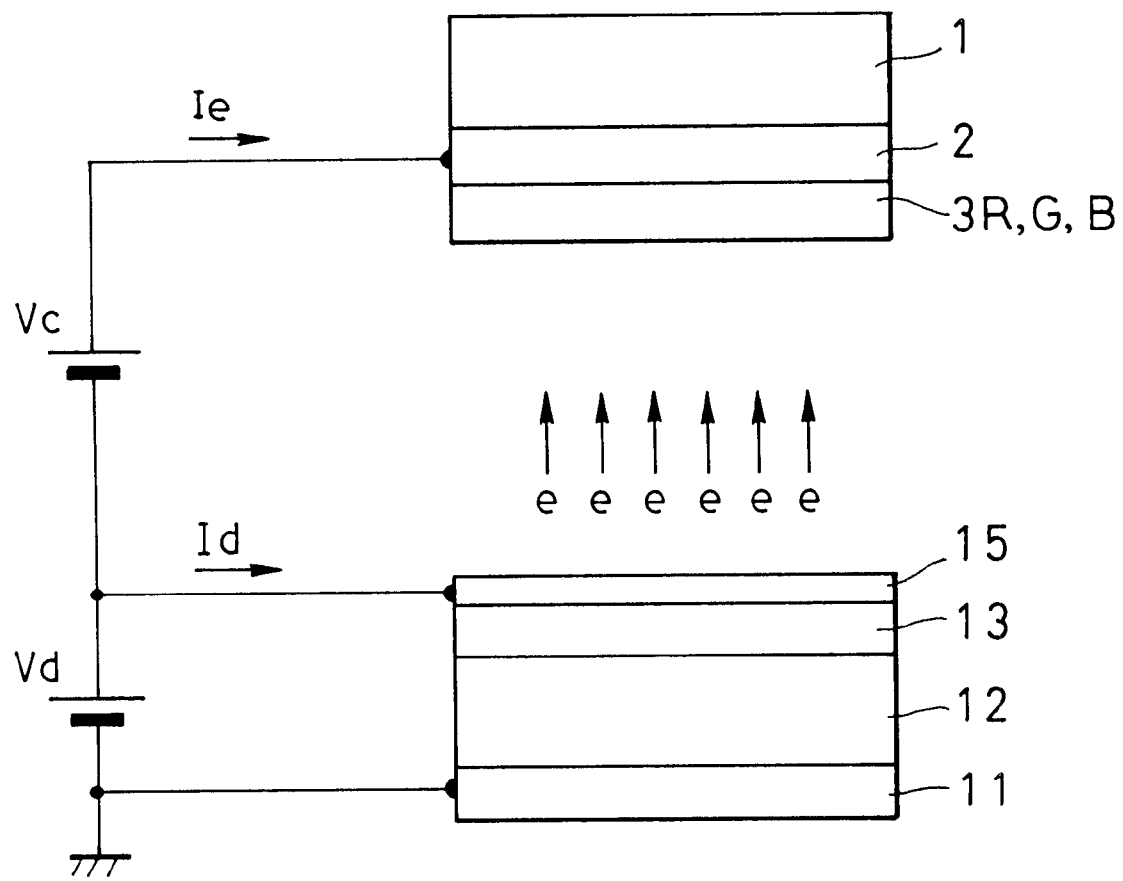
FIG. 1 is a schematic cross-sectional view of an electron emission device according to the invention.

As shown in FIG. 1, an electron emission device embodying the invention has a device substrate of a silicon wafer 12 as an electron-supply layer, on which an insulator layer 13 of silicon dioxide ($SiO_2$) and a thin-film metal electrode 15 of gold (Au) facing a vacuum space are layered or formed in turn at one side. On the other side of the device substrate 12, an ohmic electrode 11 of tungsten (W) is formed. Particularly, it should be noted that the electron-supply layer 12 is made of a silicon wafer. The insulator layer 13 is deposited in relatively thicker thicknesses so as to have a thickness of 50 nm or greater. A second substrate 1 is fixed to the first substrate 12 of silicon wafer so as to sandwich a vacuum space therebetween. The silicon wafer may be formed on a ceramics plate such as $Al_2O_3$, $Si_3N_4$ and BN etc.

This electron emission device can be regarded as a diode of which the thin-film metal electrode 15 at its surface is connected to a positive applied voltage Vd and the back i.e., ohmic electrode 11 is connected to a ground potential. When the voltage Vd e.g. 90 V is applied between the ohmic electrode 11 and the thin-film metal electrode 15 to supply electrons into the electron-supply layer 12, a diode current Id flows. Since the insulator layer 13 has a high resistance, most of the applied electric field is applied to the insulator layer 13. The electrons travel in the conduction band in the insulator layer 13 toward the thin-film metal electrode 15. Some of the electrons that reach near the thin-film metal electrode 15 tunnel through the thin-film metal electrode 15, due to the strong electric field, to be emitted out into the vacuum space.

The electrons e (emission current Ie) discharged from the thin-film metal electrode 15 by the tunnel effect are soon accelerated by a high voltage Vc, which is applied to an opposing collector electrode (transparent electrode) 2, and is collected at the collector electrode 2. If a fluorescent substance is coated on the collector electrode 2, corresponding visible light is observed.

According to the invention, instead of amorphous silicon, the effective material for the electron-supply layer 12 of the electron emission device is particularly the silicon wafer of a single crystalline state. The dangling bonds of the silicon wafer are remarkably less than that of amorphous silicon. The silicon wafer has a high thermal durability. The silicon wafer may include any dopant.

Silicon oxide $SiO_x$ (wherein subscripted x represents an atomic ratio) is effective as the dielectric material of the insulator layer 13 and, metal oxides or metal nitrides such as $LiO_x$, $LiN_x$, $NaO_x$, $KO_x$, $RbO_x$, $CsO_x$, $BeO_x$, $MgO_x$, $MgN_x$, $CaO_x$, $CaN_x$, $SrO_x$, $BaO_x$, $ScO_x$, $YO_x$, $YN_x$, $LaO_x$, $LaN_x$, $CeO_x$, $PrO_x$, $NdO_x$, $SmO_x$, $EuO_x$, $GdO_x$, $TbO_x$, $DyO_x$, $HoO_x$, $ErO_x$, $TmO_x$, $YbO_x$, $LuO_x$, $TiO_x$, $TiN_x$, $ZrO_x$, $ZrN_x$, $HfO_x$, $HfN_x$, $ThO_x$, $VO_x$, $VN_x$, $NbO_x$, $TaO_x$, $TaN_x$, $CrO_x$, $CrN_x$, $MoO_x$, $MoN_x$, $WO_x$, $WN_x$, $MnO_x$, $ReO_x$, $FeO_x$, $FeN_x$, $RuO_x$, $OsO_x$, $CoO_x$, $RhO_x$, $IrO_x$, $NiO_x$, $PdO_x$, $PtO_x$, $CuO_x$, $CuN_x$, $AgO_x$, $AuO_x$, $ZnO_x$, $CdO_x$, $HgO_x$, $BO_x$, $BN_x$, $AlO_x$, $AlN_x$, $GaO_x$, $GaN_x$, $InO_x$, $SiN_x$, $GeO_x$, $SnO_x$, $PbO_x$, $PO_x$, $PN_x$, $AsO_x$, $SbO_x$, $SeO_x$, $TeO_x$ and the like can be used as well. Furthermore, metal complex oxides such as $LiAlO_2$, $Li_2SiO_3$, $Li_2TiO_3$, $Na_2A_{22}O_{34}$, $NaFeO_2$, $Na_4SiO_4$, $K_2SiO_3$, $K_2WO_4$, $Rb_2CrO_4$, $Cs_2CrO_4$, $MgAl_2O_4$, $MgFe_2O_4$, $MgTiO_3$, $CaTiO_3$, $CaWO_4$, $CaZrO_3$, $SrFe_{12}O_{19}$, $SrTiO_3$, $SrZrO_3$, $BaAl_2O_4$, $BaFe_{12}O_{19}$, $BaTiO_3$, $Y_3Al_5O_{12}$, $Y_3Fe_5O_{12}$, $LaFeO_3$, $La_3Fe_5O_{12}$, $La_2Ti_2O_7$, $CeSnO_4$, $CeTiO_4$, $Sm_3Fe_5O_{12}$, $EuFeO_3$, $Eu_3Fe_5O_{12}$, $GdFeO_3$, $Gd_3Fe_5O_{12}$, $DyFeO_3$, $Dy_3Fe_5O_{12}$, $HoFeO_3$, $Ho_3Fe_5O_{12}$, $ErFeO_3$, $Er_3Fe_5O_{12}$, $Tm_3Fe_5O_{12}$, $LuFeO_3$, $Lu_3Fe_5O_{12}$, $NiTiO_3$, $Al_2TiO_3$, $FeTiO_3$, $BaZrO_3$, $LiZrO_3$, $MgZrO_3$, $HfTiO_4$, $NH_4VO_3$, $AgVO_3$, $LiVO_3$, $BaNb_2O_6$, $NaNbO_3$, $SrNb_2O_6$, $KTaO_3$, $NaTaO_3$, $SrTa_2O_6$, $CuCr_2O_4$, $Ag_2CrO_4$, $BaCrO_4$, $K_2MoO_4$, $Na_2MoO_4$, $NiMoO_4$, $BaWO_4$, $Na_2WO_4$, $SrWO_4$, $MnCr_2O_4$, $MnFe_2O_4$, $MnTiO_3$, $MnWO_4$, $CoFe_2O_4$, $ZnFe_2O_4$, $FeWO_4$, $CoMoO_4$, $CoTiO_3$, $CoWO_4$, $NiFe_2O_4$, $NiWO_4$, $CuFe_2O_4$, $CuMoO_4$, $CuTiO_3$, $CuWO_4$, $Ag_2MoO_4$, $Ag_2WO_4$, $ZnAl_2O_4$, $ZnMoO_4$, $ZnWO_4$, $CdSnO_3$, $CdTiO_3$, $CdMoO_4$, $CdWO_4$, $NaAlO_2$, $MgAl_2O_4$, $SrAl_2O_4$, $Gd_3Ga_5O_{12}$, $InFeO_3$, $MgIn_2O_4$, $Al_2TiO_5$, $FeTiO_3$, $MgTiO_3$, $NaSiO_3$, $CaSiO_3$, $ZrSiO_4$, $K_2GeO_3$, $Li_2GeO_3$, $Na_2GeO_3$, $Bi_2Sn_3O_9$, $MgSnO_3$, $SrSnO_3$, $PbSiO_3$, $PbMoO_4$, $PbTiO_3$, $SnO_2$—$Sb_2O_3$, $CuSeO_4$, $Na_2SeO_3$, $ZnSeO_3$, $K_2TeO_3$, $K_2TeO_4$, $Na_2TeO_3$, $Na_2TeO_4$ and the like can be used as well and still furthermore, sulfides such as FeS, $Al_2S_3$, MgS, ZnS and the like, fluorides such as LiF, $MgF_2$, $SmF_3$ and the like, chlorides such as HgCl, $FeCl_2$, $CrCl_3$ and the like, bromides such as AgBr, CuBr, $MnBr_2$ and the like, iodide such as $PbI_2$ CuI, $FeI_2$ and the like and metal oxidized nitrides such as SiAlON and the like can be used as well for the insulator layer.

Moreover, carbon such as diamond, Fullerene ($C_{2n}$) and the like or metal carbide such as $Al_4C_3$, $B_4C$ $CaC_2$, $Cr_3C_2$, $Mo_2C$ MoC, NbC, SiC, TaC, TiC, VC, $W_2C$, WC, ZrC and the like are also effective as the dielectric material of the insulator layer 13. Fullerene ($C_{2n}$) consists of carbon atoms. The representative $C_{60}$ is a spherical surface basket molecule as known a soccer ball molecule. There is also known $C_{32}$ to $C_{960}$ and the like. The subscribed x in $O_x$, $N_x$ and the like in the above chemical formulas represent atomic ratios and also herein after.

The film thickness of the insulator layer 13 may be 50 nm or greater preferably in ranging from 100 to 1000 nm.

Metals Pt, Au, W, Ru and Ir are effective as the material for the thin-film metal electrode 15 on the electron emission side. In addition, Al, Sc, Ti, V, Cr, Mn, Fe, Co, Ni, Cu, Zn, Ga, Y, Zr, Nb, Mo, Tc, Rh, Pd, Ag, Cd, Ln, Sn, Ta, Re, Os, Tl, Pb, La, Ce, Pr, Nd, Pm, Sm, Eu, Gd, Tb, Dy, Ho, Er, Tm, Yb, Lu and the like can be used as well for the thin-film metal electrode.

Although sputtering is particularly effective in the fabrication of those layers and the substrate, vacuum deposition, CVD (Chemical Vapor Deposition), laser ablation, MBE (Molecular Beam Epitaxy) and ion beam sputtering are also effective.

Electron emission devices according to the invention each comprising an electron-supply layer of a silicon wafer were fabricated as embodiments and their characteristics were examined concretely.

First, device substrates of silicon wafer with a 5.0 μm thick were provided on each of which an ohmic electrode of W was previously deposited with a thickness of 300 nm on one side by sputtering. As comparative examples, electron-supply layers of amorphous silicon each having a 5.0 μm thick were deposited on glass substrates each of which an ohmic electrode of W was previously deposited with thick of 300 nm by sputtering. A plurality of preliminary substrates of these type were prepared.

Then, insulator layers of $SiO_x$ were deposited on the electron-supply layers of the preliminary substrates by sputtering respectively while changing the film thickness thereof in a range from 50 nm to 1000 nm. Thus a plurality of second preliminary substrates were provided. Each $SiO_x$ insulator layer was deposited by sputtering by using a gas of Ar, Kr or Xe or a mixture thereof, or a gas mixture essentially consisting of one of those rare gases with $O_2$, $N_2$ or the like mixed therein, under the sputtering conditions of a gas pressure of 0.1 to 100 mTorr, preferably 0.1 to 20 mTorr and the depositing rate of 0.1 to 1000 nm/min, preferably 0.5 to 100 nm/min.

Finally, a thin-film metal electrode of Pt was deposited with thickness of 10 nm on the surface of the amorphous $SiO_x$ layer of each substrate by sputtering, thus providing plural device substrates.

Meanwhile, transparent substrates were prepared, each of which has an ITO collector electrode formed inside a transparent glass substrate and has a fluorescent layer of a fluorescent substance corresponding to R, G or B color emission formed on the collector electrode by the normal scheme.

Electron emission devices were assembled in each of which the device substrate and the transparent substrate are supported apart from one another by 10 mm in parallel by a spacer in such a way that the thin-film metal electrode 15 faced the collector electrode 2, with the clearance therebetween made to a vacuum of $10^{-7}$ Torr or $10^{-5}$ Pa.

Then, the emission current Ie of the resultant electron emission devices were measured under the conditions that a driving voltage Vd of 0 to 110 V and an acceleration voltage 200 V were applied thereto.

After the measurement, the electron emission devices are heated or baked at temperatures of 25° C., 200° C., 300° C., 400° C., and 500° C. in a vacuum atmosphere for one hour (1H) respectively.

Then, the emission current Ie of the heated and cooled plural devices corresponding to the baked temperatures were measured again under the same conditions that an applied voltage Vd of from 0 to 110 V and an acceleration voltage 200 V were applied thereto. The emission currents Ie of the devices before and after the heating treatment were compared to each other. The results are shown in Table 1 below.

TABLE 1

| | Emission current (A/cm$^2$) | | |
|---|---|---|---|
| | Before heating | After heating 300° C., 1H | 500° C., 1H |
| Comparatives | 2.3 × 10$^{-4}$ | 8.1 × 10$^{-9}$ | 3.9 × 10$^{-10}$ |
| Embodiments | 2.1 × 10$^{-4}$ | 2.0 × 10$^{-4}$ | 1.8 × 10$^{-4}$ |

Figure 2:
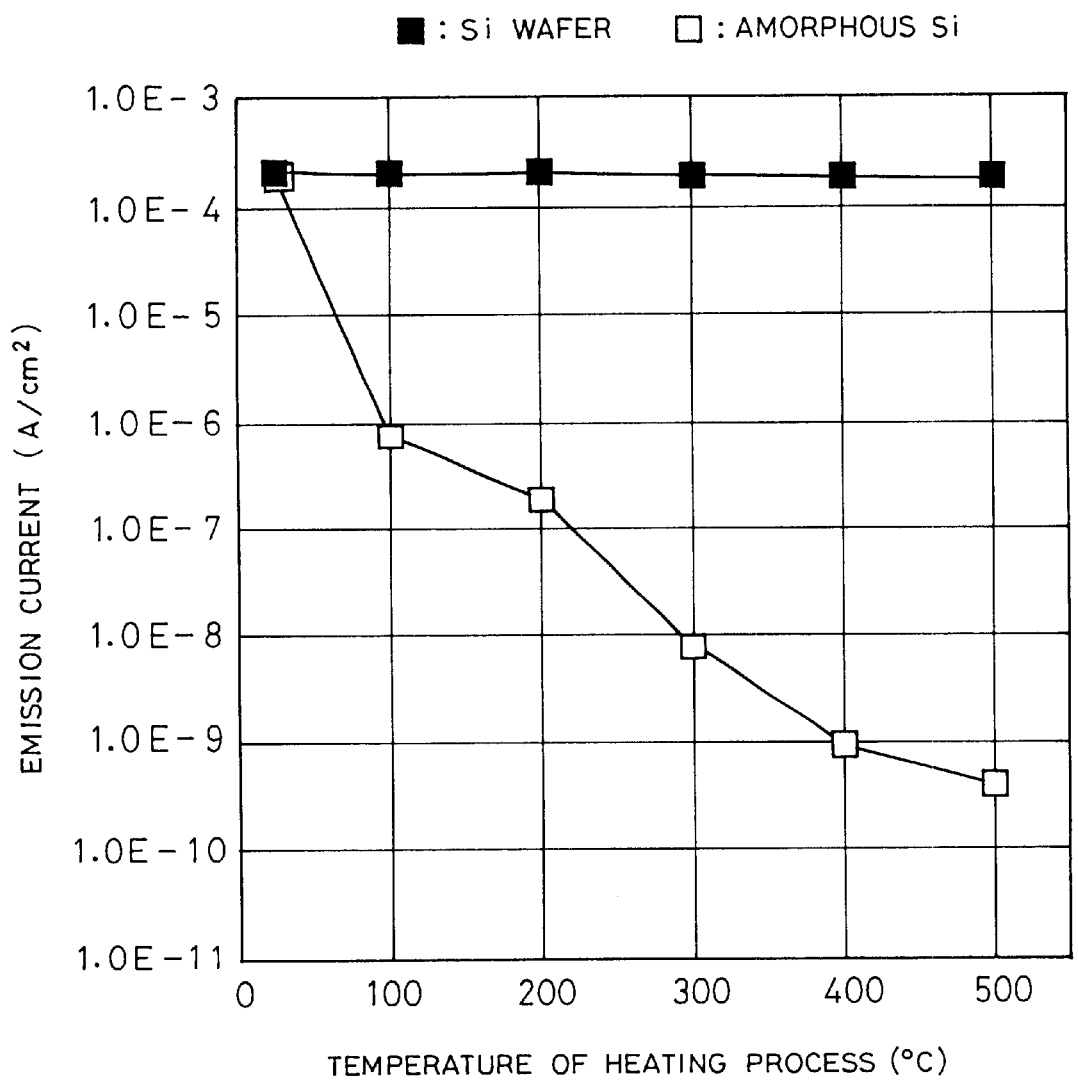
FIG. 2 is a graph showing a relationship between the emission current of the electron emission device and the temperatures at which the devices are baked or heated in the process for manufacturing the electron emission display device according to the invention.

FIG. 2 shows the variations of the emission currents with the driving voltage Vd of 0 to 200 V both of the resultant electron emission devices and the comparatives with respect to the temperatures at which the devices were baked or heated in the manufacturing process in which. In FIG. 2, the plots of □ represent the emission current values of the comparative devices including the amorphous silicon electron-supply layer, in which the emission current values thereof rapidly decrease as the baked temperature rises. The plots of ■ represent the emission current values of the devices of embodiments including the silicon wafer electron-supply layer, in which these devices keep the emission currents of 1×10$^{-6}$ A/cm$^2$ or more even after the heating of the 300° C. temperature. As seen from the figure, the devices of embodiments have a stable emission current of about 2×10$^{-4}$ A/cm$^2$.

Figure 3:
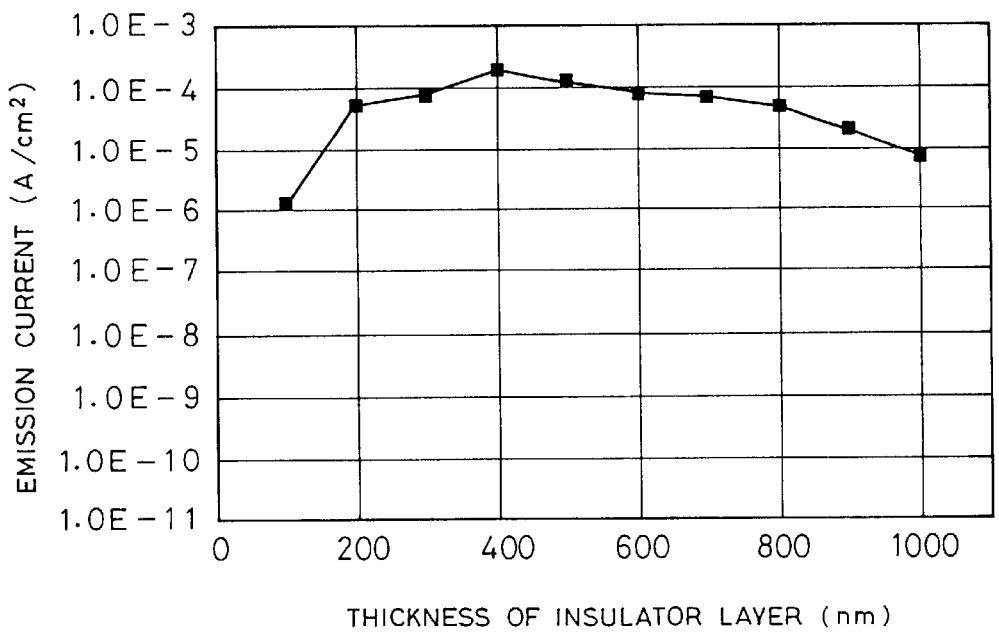
FIG. 3 is a graph showing a relationship between the emission current and the film thickness of the insulator layer in the electron emission device according to the invention.
Figure 4:
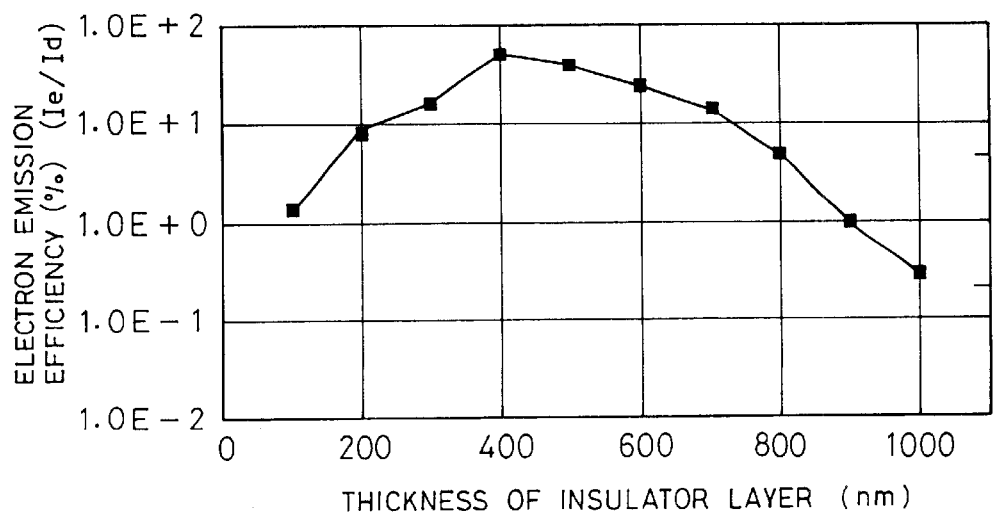
FIG. 4 is a graph showing a relationship between the electron emission efficiency and the film thickness of the insulator layer in the electron emission device according to the invention.

FIGS. 3 and 4 show the variations of the maximum emission current Ie and the maximum electron emission efficiency (Ie/Id) respectively with respect to the film thickness (ranging from 50 nm to 1000 nm) of the insulator layer of the devices having electron-supply layers of silicon wafer, when a driving voltage Vd of from 0 to 200 V was applied to the prepared electron emission devices. As apparent from FIGS. 3 and 4, the devices whose insulator layers had thicknesses of from 50 nm to 1000 nm showed the maximum emission current of about 1×10$^{-6}$ A/cm$^2$ or more and the maximum electron emission efficiency of about 1×10$^{-3}$.

It is understood from those results that the electron-supply layer of silicon wafer is effective for the electron emission device comprising; the insulator layer with a 50 nm thickness or greater; and the thin-film metal electrode facing a vacuum space, so that the electron emission device emits stably electrons when applying a relatively low voltage across the electron-supply layer and the thin-film metal electrode.

Figure 5:
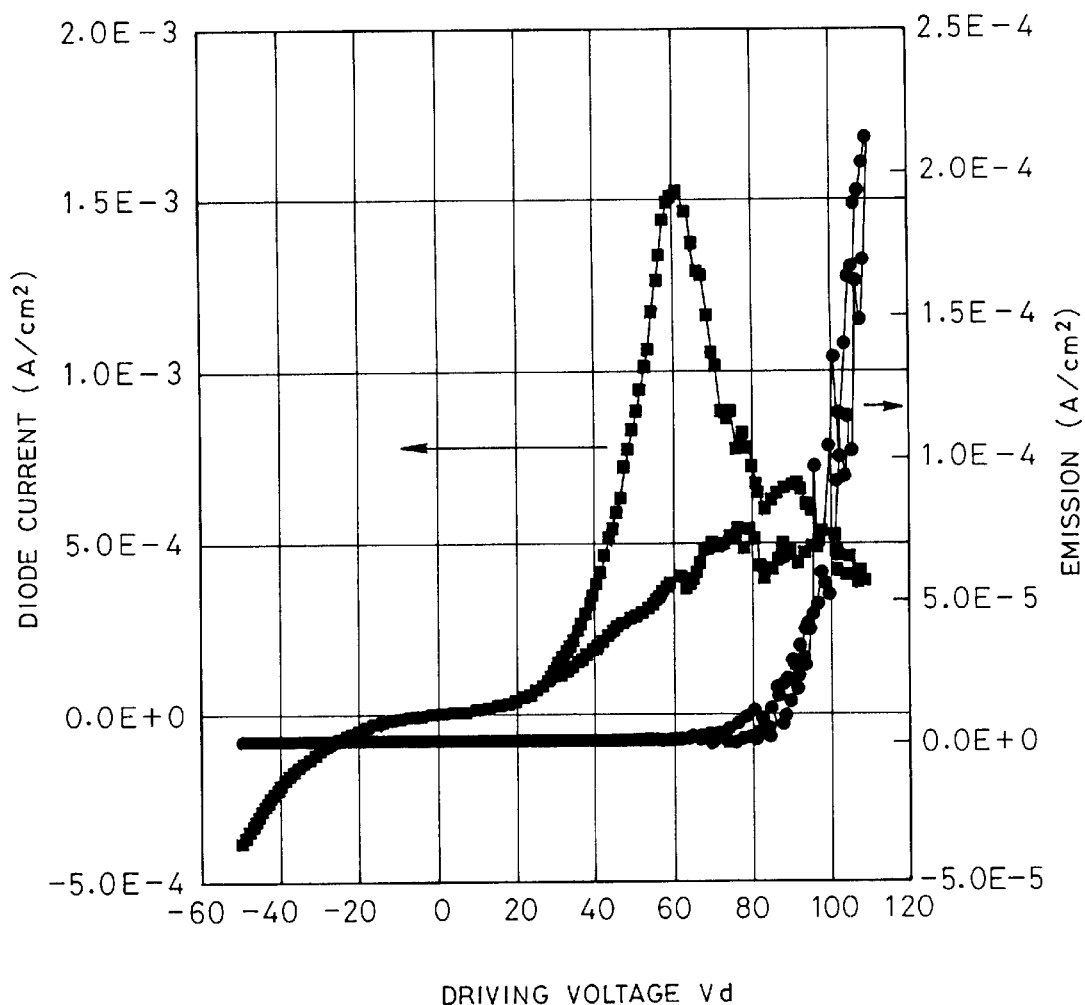
FIG. 5 is a graph illustrating a relationship of a Diode current Id and the Emission current Ie with respect to the Driving voltage Vd of the electron emission device of an embodiment according to the invention.

FIG. 5 shows a property relationship of a Diode current Id and the Emission current Ie with respect to the Driving voltage Vd of the electron emission device comprising the Al ohmic electrode with a 300 nm thickness; the electron-supply layer made of silicon wafer; the $SiO_x$ insulator layer with a 400 nm thickness; and the Au thin-film metal electrode with a 10 nm thickness. As seen from FIG. 5, it is understood that the diode current Id shows a hysteresis property. In the Figure, a voltage drop of diode current Id occurs at the starting point of the emission current Ie and then the emission current Ie rises.

With a voltage of approximately 4 kV applied between the fluorescent-substance coated collector electrode and the thin-film metal electrode of one embodiment of the above devices whose insulator layers have thicknesses of 50 nm or greater, a uniform fluorescent pattern corresponding to the shape of the thin-film metal electrode was observed. This indicates that the electron emission from the amorphous $SiO_x$ layer is uniform and has a high linear movement, and that those devices can serve as an electron emission diode, or a light-emitting diode or a laser diode which emits electromagnetic waves with millimeter or sub-millimeter wavelength and also a high speed switching device.

By a scanning electron microscope (SEM), there were observations of the surface of the $SiO_x$ insulator layer resulted from the sputtering during the above deposition process, microstructures composed of grain surface each having about 20 nm diameter appeared. The microstructures composed of grain structure of $SiO_x$ of the insulator layer, seems to cause the peculiar phenomena that the tunnel current flows through the insulator layer which has a thickness of 50 nm or greater. While $SiO_x$ is an insulator by nature, multiple bands with low potentials are caused by the occurrence of defects adjacent thereto or impurities in the forbidden band of the insulator layer. It is assumed that electrons tunnel-pass through multiple bands with the low-potential one after another, and thus pass through the insulator layer of 50 nm or greater in thickness as a consequence.

Figure 6:
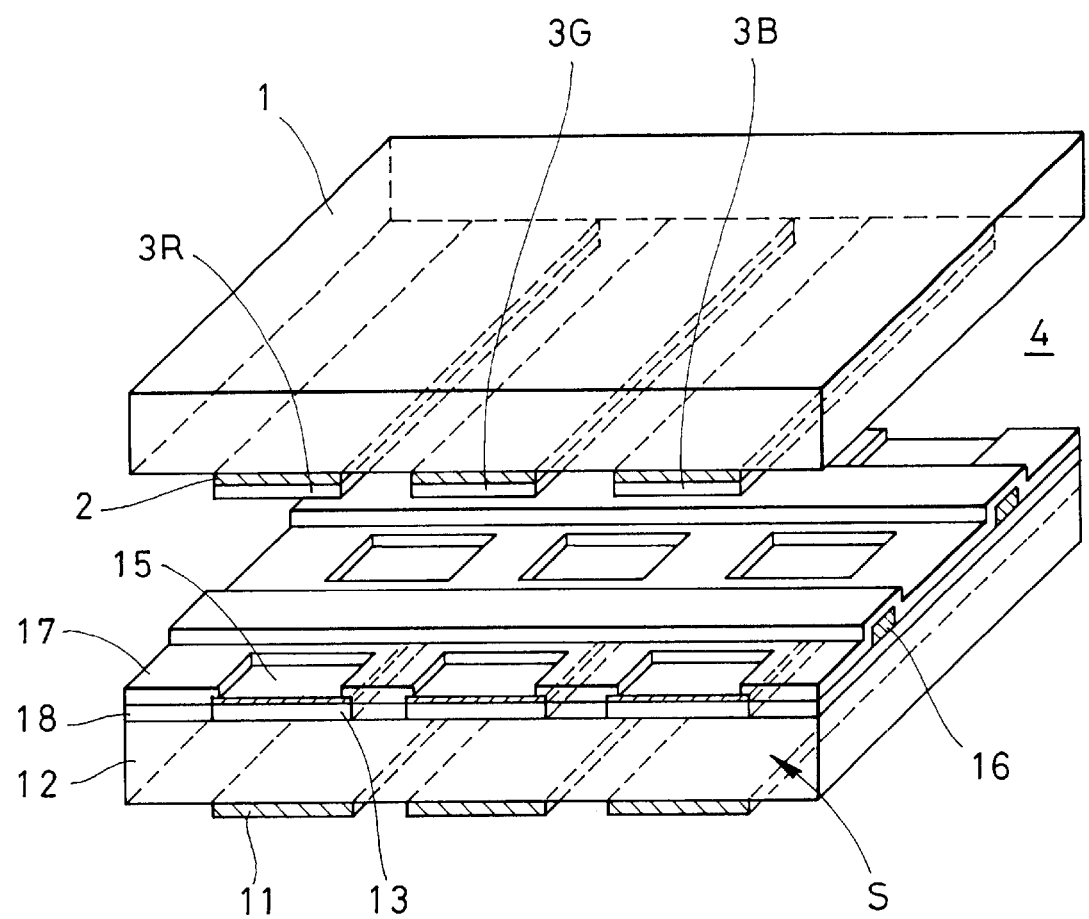
FIG. 6 is a schematic perspective view showing an electron emission display device according to one embodiment of the invention.

FIG. 6 shows an electron emission display device according to one embodiment of the invention. This embodiment comprises a pair of the transparent substrate 1 and the device substrate 12, which face each other with a vacuum space 4 in between. In the illustrated electron emission display apparatus, a plurality of transparent collector electrodes 2 of, for example, an indium tin oxide (so-called ITO), tin oxide (SnO), zinc oxide (ZnO) or the like, are formed in parallel on the inner surface of the transparent glass substrate 1 or the display surface (which faces the back substrate 12). The collector electrodes 2 may be formed integrally. The transparent collector electrodes which trap emitted electrons are arranged in groups of three in association with red (R), green (G) and blue (B) color signals in order to provide a color display panel, and voltages are applied to those three collector electrodes respectively. Therefore, fluorescent layers 3R, 3G and 3B of fluorescent substances corresponding to R, G and B color emissions are respectively formed on the three collector electrodes 2 in such a way as to face the vacuum space 4.

A plurality of ohmic electrodes 11 are formed in parallel on the inner surface of the device substrate 12 of silicon wafer which faces the transparent glass substrate 1 with the vacuum space 4 in between (i.e., said inner surface faces the transparent glass substrate 1). An auxiliary insulator layer 18 made of an insulator such as $SiO_2$, $SiN_x$, $Al_2O_3$ or AlN serves as separator for defining pixels for the insulator layers 13 of the electron emission device S. The electron emission devices S are fabricated on the ohmic electrodes 11. In order that adjoining thin-film metal electrodes 15 are electrically connected to each other, a plurality of bus electrodes 16 are formed on parts of the thin-film metal electrodes 15, extending in parallel to one another and perpendicular to the ohmic electrodes 11. Each electron emission device B comprises the electron-supply layer 12 of silicon wafer, on which the insulator layer 13 and the thin-film metal electrode 15 are formed in order and along with the associated ohmic electrode 11. The thin-film metal electrodes 15 face the vacuum space 4. A second auxiliary insulator layer 17 with openings is formed to separate the surfaces of the thin-film metal electrodes 15 into a plurality of electron emission regions. This second auxiliary insulator layer 17 covers the bus electrodes 16 to prevent unnecessary short-circuiting.

The material for the ohmic electrodes 11 is Au, Pt, Al, W or the like which is generally used for the wires of an IC, and has a uniform thickness for supplying substantially the same current to the individual devices.

While the material for the electron-supply layer 12 of silicon wafer is monocrystal Si, the other amorphous and polycrystal silicon can be used as well for the wafer.

Figure 7:
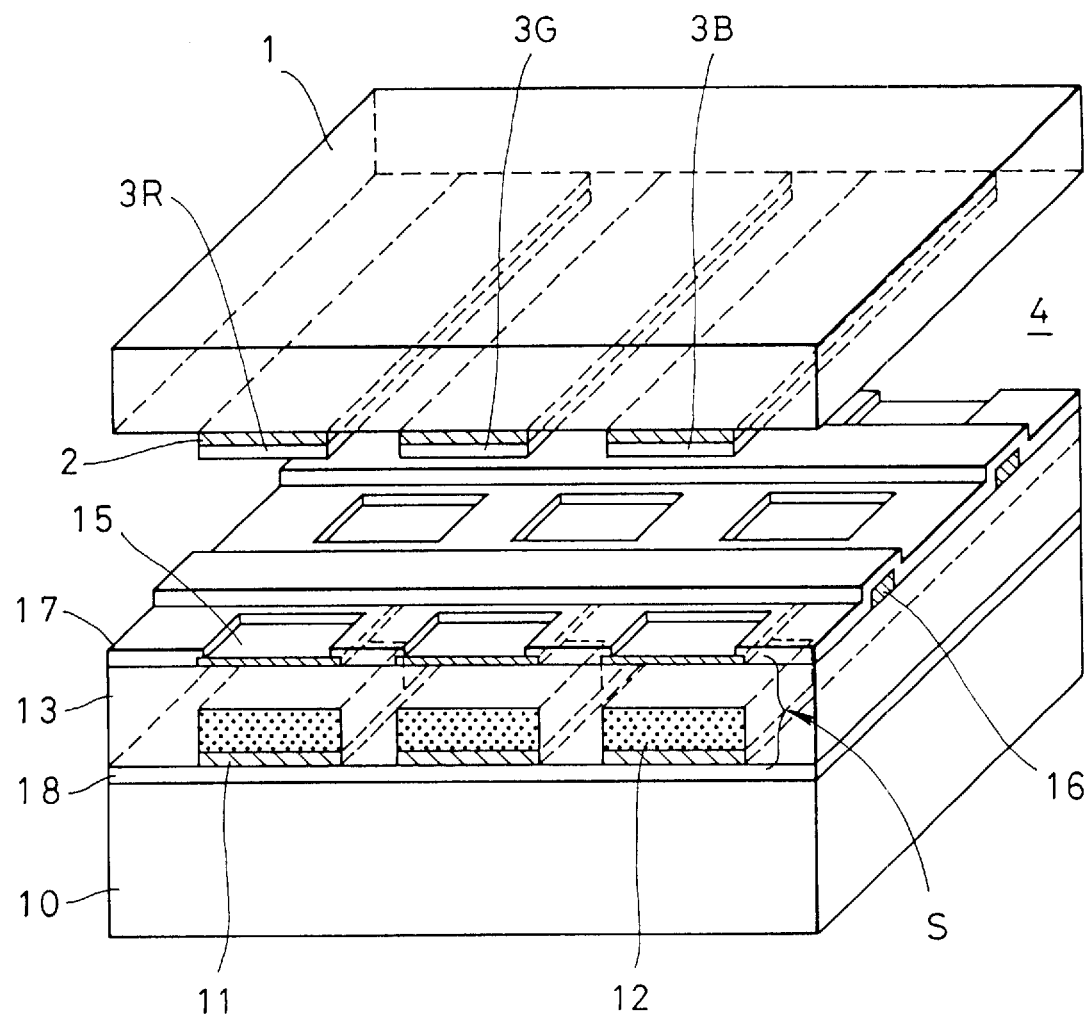
FIG. 7 is a schematic perspective view showing an electron emission display device according to another embodiment of the invention.

FIG. 7 shows an electron emission display device according to another embodiment of the invention. This embodiment comprises a pair of the transparent substrate 1 and a device substrate 10 made of glass or ceramics such as $Al_2O_3$, $Si_3N_4$ and BN or the like which face each other with a vacuum space 4 in between. The inner side of the device substrate 10 is coated with an auxiliary insulator layer 18. The auxiliary insulator layer 18 is comprised of an insulator such as $SiO_2$, $SiN_x$, $Al_2O_3$, or AlN, and serves to prevent an adverse influence of the device substrate 10 on the device (such as elution of an impurity such as an alkaline component or a roughened substrate surface).

A plurality of ohmic electrodes 11 are formed in parallel on the inner surface of the auxiliary insulator layer 18 on the device substrate 10. A plurality of electron emission devices S are formed on the ohmic electrodes 11. Each electron emission device comprises the electron-supply layer 12 made of amorphous or polycrystal silicon deposited on the associated ohmic electrode 11. The electron emission device further comprises the insulator layer 13 and the thin-film metal electrode 15 which are formed in order on the electron-supply layer 12. The plurality of bus electrodes 16 and the second auxiliary insulator layer 17 are formed in such a manner of the foregoing embodiment.

The electron emission display device shown in FIG. 7 may be fabricated through the following process. First, a planar thin metal film for the ohmic electrode is deposited on one side of an silicon wafer monocrystal having a predetermined thickness for the electron-supply layer. Next, this silicon wafer is adhered at the thin metal film onto the device substrate 10 with the auxiliary insulator layer 18. After that, this silicon wafer with the planar thin metal is divided into a plurality of stripes of the electron-supply layers 12 and the ohmic electrodes 11 in parallel to each other on the device substrate 10, by using a cutting method such as photolithography, wet or dry etching, or laser cutting, or the like. After washing and rinsing, the insulator layers 13 are deposited on the electron-supply layers 12. The thin-film metal electrodes 15 are deposited as island-like on the insulator layers 13 along the electron-supply layer 12 with a predetermined interval for pixels. The bus electrodes 16 extending in parallel to one another and perpendicular to the ohmic electrodes 11 are formed on parts of the thin-film metal electrodes 15 and the insulator layers 13 so as to connect adjacent thin-film metal electrodes 15. The second auxiliary insulator layer 17 with openings is formed on the insulator layers 13 and the bus electrodes 16 in such a manner that the openings correspond to the thin-film metal electrodes 15.

From the principle of electron emission, it is better that the material for the thin-film metal electrode 15 has a lower work function ϕ and is thinner. To increase the electron emission efficiency, the material for the thin-film metal electrode 15 should be a metal of the group I or group II in the periodic table; for example, Mg, Ba, Ca, Cs, Rb, Li, Sr, and the like are effective and alloys of those elements may be used as well. To make the thin-film metal electrode 15 very thin, the material for the thin-film metal electrode 15 should be chemically stable with a high conductivity; for example, single substances of Au, Pt, Lu, Ag and Cu or alloys thereof are desirable. It is effective to coat or dope a metal with a low work function as described above on or in those metals.

The material for the bus electrodes 16 can be Au, Pt, Al or the like which is generally used for the wiring of an integrated circuit IC, and should have a thickness enough to supply substantially the same potential to the individual devices, adequately of 0.1 to 50 μm.

A simple matrix system or an active matrix system may be employed as the driving system for the display device of the invention.

What is claimed is:

1. An electron emission device comprising:
   an electron-supply layer having a top surface;
   an insulator layer formed on the top surface of the electron-supply layer; and
   a thin-film metal electrode having a bottom surface formed on the insulator layer and a top surface facing a space;
   wherein the insulator layer has a film thickness of 50 nm or greater measured between the bottom surface of the thin-film metal electrode and top surface of the electron-supply layer, and
   the electron emission device is configured to emit electrons when an electric field is applied between the electron-supply layer and the thin-film metal electrode.

2. The electron emission device according to claim 1, wherein the electron-supply layer is made of metal or semiconductor.

3. The electron emission device according to claim 1, wherein the space is a vacuum space.

4. The electron emission device according to claim 1, wherein the electron-supply layer is made of a silicon wafer.

5. The electron emission device according to claim 4, wherein the silicon wafer is single crystalline.

6. The electron emission device according to claim 1, wherein the insulator layer comprises one of silicon oxide, metal oxides, metal nitrides, metal complex oxides, sulfides, fluorides, chlorides, bromides, iodides, metal oxidized nitrides, metal carbides and carbon.

7. An electron emission display device comprising:
   first and second substrates facing each other with a space in between;
   a plurality of electron emission devices provided on the first substrate;
   a collector electrode provided in the second substrate; and
   a fluorescent layer formed on the collector electrode;
   wherein each of the electron emission devices comprises
      an electron-supply layer,
      an insulator layer formed on the electron-supply layer, and
      a thin-film metal electrode formed on the insulator layer and facing the space between the first and second substrates,
      wherein the insulator layer has a film thickness of 50 nm or greater measured between a bottom surface of the thin-film metal electrode and a top surface of the electron-supply layer.

8. The electron emission display device according to claim 7, wherein the electron-supply layer is made of metal or semiconductor.

9. The electron emission display device according to claim 7, wherein the space is a vacuum space.

10. The electron emission display device according to claim 7, wherein the electron-supply layer is made of a silicon wafer.

11. The electron emission display device according to claim 10, wherein the silicon wafer is single crystalline.

12. The electron emission display device according to claim 7, wherein the insulator layer comprises one of silicon oxide, metal oxides, metal nitrides, metal complex oxides, sulfides, fluorides, chlorides, bromides, iodides, metal oxidized nitrides, metal carbides and carbon.

* * * * *